United States Patent
Powell et al.

(10) Patent No.: US 9,745,927 B2
(45) Date of Patent: *Aug. 29, 2017

(54) EMISSIONS REDUCTION SYSTEM FOR AN INTERNAL COMBUSTION ENGINE

(71) Applicant: DENSO International America, Inc., Southfield, MI (US)

(72) Inventors: Patrick Powell, Farmington Hills, MI (US); Michael Bima, Milford, MI (US)

(73) Assignee: Denso International America, Inc., Southfield, MI (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/642,839

(22) Filed: Mar. 10, 2015

(65) Prior Publication Data

US 2016/0265492 A1   Sep. 15, 2016

(51) Int. Cl.
| | |
|---|---|
| *F02B 33/44* | (2006.01) |
| *F01N 5/04* | (2006.01) |
| *F01N 3/00* | (2006.01) |
| *F02B 23/00* | (2006.01) |
| *F02M 35/10* | (2006.01) |
| *F02D 41/00* | (2006.01) |

(Continued)

(52) U.S. Cl.
CPC ....... *F02M 35/10242* (2013.01); *F02B 37/10* (2013.01); *F02B 39/10* (2013.01); *F02D 41/0007* (2013.01); *F02M 35/10157* (2013.01); *F02D 41/064* (2013.01); *F02D 41/10* (2013.01); *F02D 2200/0414* (2013.01); *Y02T 10/144* (2013.01)

(58) Field of Classification Search
CPC ........ F02M 35/10242; F02M 35/10157; F02B 75/10; F02D 41/0007; F02D 41/064; F02D 41/10; F02D 2200/0414
USPC .......................... 60/605.1, 280, 274; 123/585
See application file for complete search history.

(56) References Cited

U.S. PATENT DOCUMENTS

| | | | |
|---|---|---|---|
| 1,658,925 | A | 2/1928 | Jardine |
| 1,881,259 | A | 10/1932 | Beck |

(Continued)

FOREIGN PATENT DOCUMENTS

| | | |
|---|---|---|
| DE | 102006016109 A1 | 10/2007 |
| EP | 1201908 A2 | 5/2002 |

(Continued)

*Primary Examiner* — Thai Ba Trieu
(74) *Attorney, Agent, or Firm* — Harness, Dickey & Pierce, P.L.C.

(57) ABSTRACT

The present teachings provide for an air system for an internal combustion engine ("ICE"). The air system can include a compressor, separation device, first conduit, second conduit and a system for controlling a ratio of gasses that enter the combustion chamber during an intake stroke. The separation device can include a housing and membrane. The housing can be fluidly coupled to the compressor and configured to receive a first volume of intake air therefrom. The membrane can be disposed within the housing and configured to separate the first volume of intake air into a volume of nitrogen-rich air and a volume of oxygen-rich air. The first conduit can fluidly couple the compressor to the combustion chamber. The second conduit can fluidly couple the compressor to the separation device. The gasses can include the volume of nitrogen-rich air, the volume of oxygen-rich air, and a second volume of intake air.

17 Claims, 5 Drawing Sheets

(51) Int. Cl.
   *F02B 37/10*  (2006.01)
   *F02B 39/10*  (2006.01)
   *F02D 41/06*  (2006.01)
   *F02D 41/10*  (2006.01)

(56) References Cited

U.S. PATENT DOCUMENTS

| | | | |
|---|---|---|---|
| 3,412,552 | A | 11/1968 | Elsbett |
| 3,780,980 | A | 12/1973 | Kallel |
| 4,475,494 | A | 10/1984 | Huther |
| 4,503,817 | A | 3/1985 | Klomp et al. |
| 4,779,584 | A | 10/1988 | Mosler |
| 5,147,417 | A * | 9/1992 | Nemser ............... B01D 53/22 123/26 |
| 5,526,641 | A * | 6/1996 | Sekar .................. F02M 25/12 123/585 |
| 5,636,619 | A | 6/1997 | Poola et al. |
| 5,640,845 | A * | 6/1997 | Ng ........................ F01N 3/08 60/274 |
| 5,649,517 | A | 7/1997 | Poola et al. |
| 5,671,712 | A | 9/1997 | Uchida |
| 5,673,656 | A | 10/1997 | Knob |
| 5,803,042 | A | 9/1998 | Bortone |
| 5,937,799 | A * | 8/1999 | Binion ................ F02M 25/12 123/25 C |
| 5,960,777 | A | 10/1999 | Nemser et al. |
| 6,055,808 | A | 5/2000 | Poola et al. |
| 6,067,973 | A * | 5/2000 | Chanda ................ F02M 23/00 123/585 |
| 6,173,567 | B1 | 1/2001 | Poola et al. |
| 6,478,852 | B1 | 11/2002 | Callaghan et al. |
| 6,939,517 | B2 * | 9/2005 | Ooe ..................... B01D 53/92 422/110 |
| 7,455,046 | B2 | 11/2008 | Biruduganti et al. |
| 7,465,337 | B2 * | 12/2008 | Gaertner ............... F02M 25/12 123/585 |
| 7,938,884 | B2 | 5/2011 | Barnette et al. |
| 8,206,493 | B2 | 6/2012 | Shimizu et al. |
| 8,347,624 | B2 | 1/2013 | Pursifull et al. |
| 8,371,118 | B2 | 2/2013 | Ulrey et al. |
| 8,607,769 | B2 | 12/2013 | Gaur et al. |
| 8,813,718 | B2 | 8/2014 | Malfa et al. |
| 9,062,631 | B2 * | 6/2015 | Kinugawa ............ F02M 23/00 |
| 2004/0025507 | A1 * | 2/2004 | Leigh .................... B64D 37/32 60/608 |
| 2006/0180115 | A1 | 8/2006 | Rubert |
| 2013/0032123 | A1 * | 2/2013 | Kinugawa ............ F02M 23/00 123/443 |
| 2013/0055897 | A1 | 3/2013 | Lokhandwala |
| 2013/0239804 | A1 | 9/2013 | Wynn et al. |
| 2014/0109850 | A1 | 4/2014 | Gonigman et al. |
| 2015/0314231 | A1 | 11/2015 | Bowen et al. |
| 2016/0220950 | A1 | 8/2016 | Ribarov |
| 2016/0256827 | A1 | 9/2016 | Van Der Pluijm et al. |
| 2017/0007966 | A1 | 1/2017 | Rekow et al. |

FOREIGN PATENT DOCUMENTS

| | | |
|---|---|---|
| JP | H0270968 A | 3/1990 |
| JP | H06137155 A | 5/1994 |
| JP | 08254161 A * | 10/1996 |
| JP | 2002122049 A | 4/2002 |
| JP | 2004190570 A * | 7/2004 |
| JP | 2006220038 A | 8/2006 |
| JP | 2007285281 A * | 11/2007 |
| JP | 2011163201 A | 8/2011 |
| JP | 2013032708 A | 2/2013 |
| WO | WO-2012100182 A1 | 7/2012 |
| WO | WO-2012104272 A1 | 8/2012 |
| WO | WO-2012172405 A1 | 12/2012 |

* cited by examiner

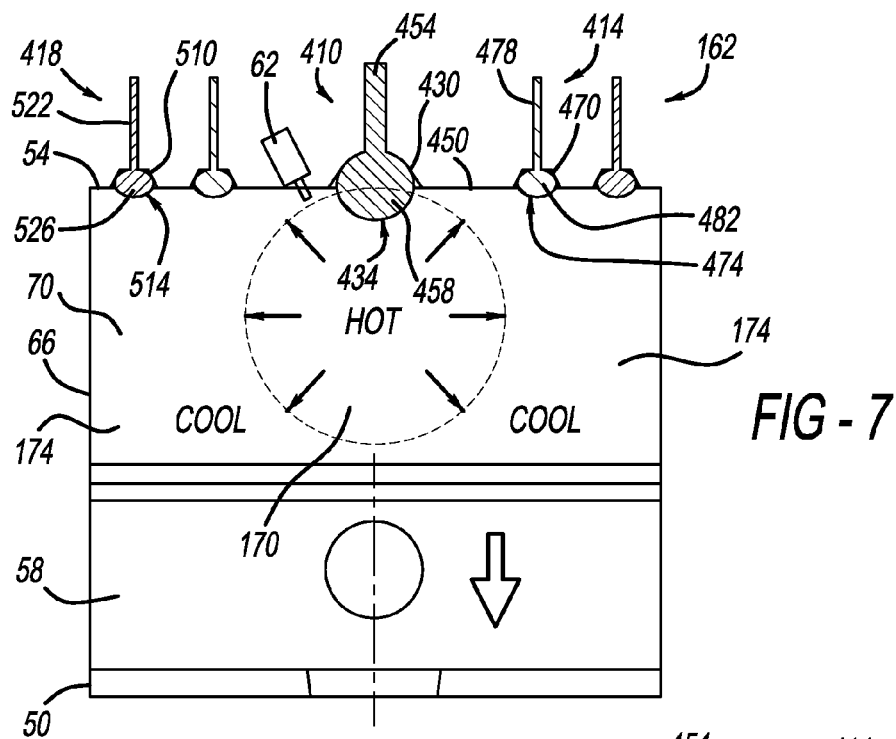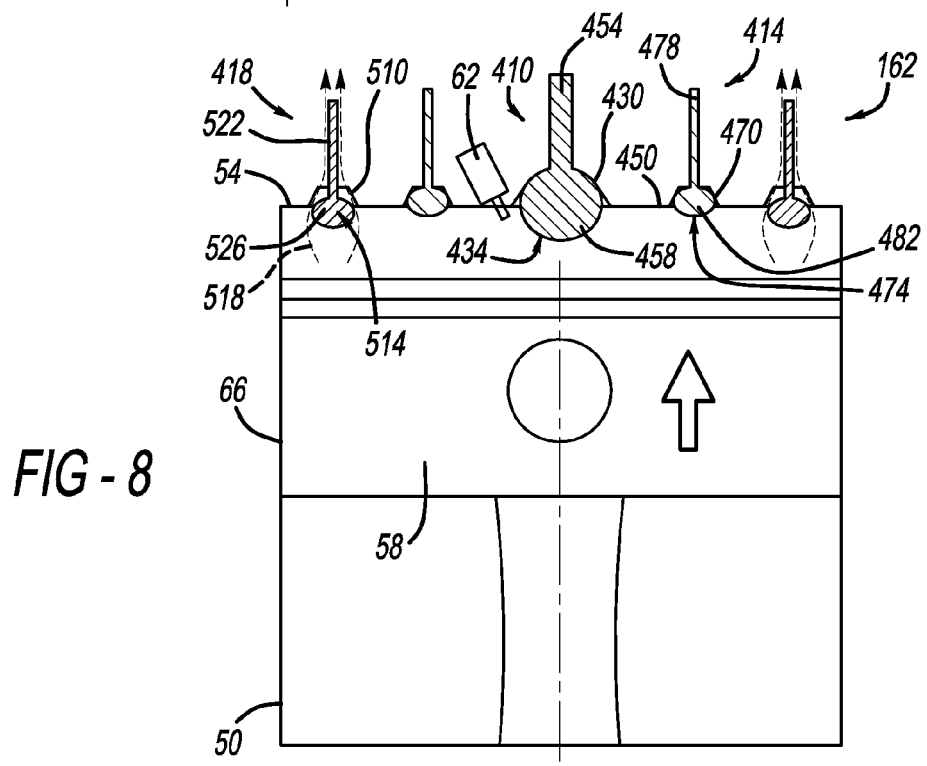

EMISSIONS REDUCTION SYSTEM FOR AN INTERNAL COMBUSTION ENGINE

FIELD

The present disclosure relates to an emissions reduction system for an internal combustion engine.

BACKGROUND

This section provides background information related to the present disclosure which is not necessarily prior art.

Internal combustion engines ("ICEs") typically draw ambient air into a combustion chamber where the air and a fuel are compressed by a compression device, such as a piston-cylinder for example, and ignited to cause combustion of the air-fuel mixture. The combustion gases generally expand to do work on the compression device, such as moving the piston to drive a crankshaft for example. The combustion gases are typically then expelled from the combustion chamber through an exhaust of the ICE. Combustion of the fuel in the ICE, such as diesel, gasoline, ethanol, or natural gas for example, typically results in incomplete combustion of the fuel. Incomplete combustion can result in increased emissions being released from the exhaust, such as NOx and particulate matter (e.g. soot). Additionally, levels of NOx emissions typically increase with higher combustion chamber temperatures and higher combustion chamber temperatures can also lead to increased wear on other components of the ICE.

In order to reduce NOx emissions and combustion chamber temperatures, modern ICEs typically include an exhaust gas recirculation ("EGR") system configured to recirculate some of the exhaust gases back into the combustion chamber. Such EGR systems can be complex and costly additions to the ICE. In some applications, such as diesel ICEs for example, EGR systems can also result in decreases in efficiency and increases in particulate matter emissions.

SUMMARY

This section provides a general summary of the disclosure, and is not a comprehensive disclosure of its full scope or all of its features.

The present teachings provide for an air system for an internal combustion engine ("ICE"). The ICE can have a combustion chamber. The air system can include a compressor, a separation device, a first conduit, a second conduit and a system for controlling a ratio of gasses that enter the combustion chamber during an intake stroke of the ICE. The compressor can be configured to compress intake air. The separation device can include a housing and a membrane. The housing can be fluidly coupled to the compressor and can be configured to receive a first volume of intake air from the compressor. The membrane can be disposed within the housing and can be configured to separate the first volume of intake air into a volume of nitrogen-rich air and a volume of oxygen-rich air. The first conduit can fluidly couple the compressor to the combustion chamber. The second conduit can fluidly couple the compressor to the separation device. The gasses can include the volume of nitrogen-rich air, the volume of oxygen-rich air, and a second volume of intake air.

The present teachings further provide for an air system for an internal combustion engine ("ICE"). The ICE can have a combustion chamber. The air system can include a separation device and a cylinder head. The separation device can be configured to receive a first volume of intake air and separate the first volume of intake air into a volume of nitrogen-rich air and a volume of oxygen-rich air. The cylinder head can be in fluid communication with the separation device and the combustion chamber. The cylinder head can be configured to direct the volume of oxygen-rich air into a central area of the combustion chamber and the volume of nitrogen-rich air about a periphery of the combustion chamber.

The present teachings further provide for a method of operating an internal combustion engine ("ICE"). The ICE can have a combustion chamber, a sensor, an air charging unit, and an air separation membrane. The method can include sensing, at the sensor, an operating condition of the ICE. The method can include adjusting a pressure of a volume of output air of the charging device based on the operating condition. The method can include separating, at the air separation membrane, the volume of output air into a nitrogen-rich stream of air and an oxygen-rich stream of air. The method can include introducing the oxygen-rich stream of air into the combustion chamber at a central area of the combustion chamber during an intake stroke of the ICE. The method can include introducing the nitrogen-rich stream of air into the combustion chamber at a peripheral area of the combustion chamber during the intake stroke of the ICE.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a sectional view similar to FIG. 5, illustrating combustion of gasses during a power stroke;

FIG. 8 is a sectional view similar to FIG. 5, illustrating a flow of combustion products during an exhaust stroke.

Corresponding reference numerals indicate corresponding parts throughout the several views of the drawings.

DETAILED DESCRIPTION

Example embodiments will now be described more fully with reference to the accompanying drawings.

Figure 1:
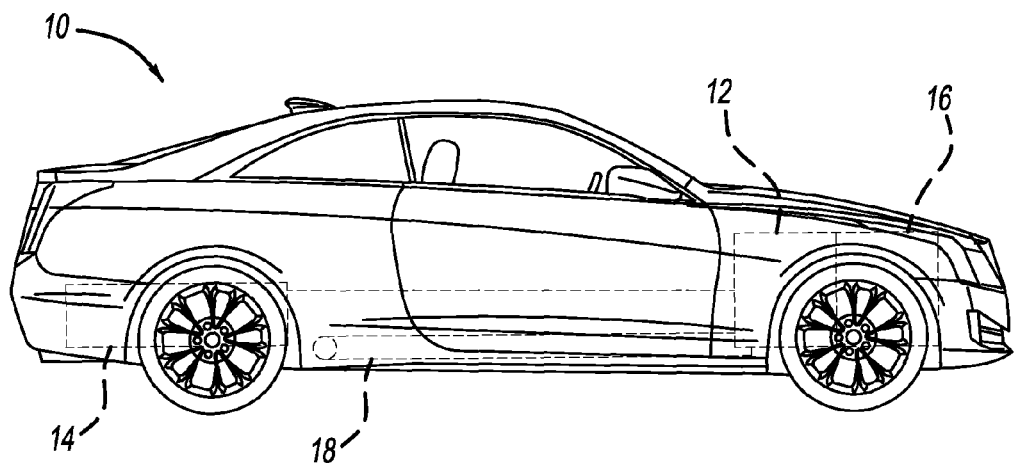
FIG. 1 is a representative vehicle including an internal combustion engine ("ICE") and an air handling system in accordance with the present teachings.

The present teachings are directed to an air system for use in an internal combustion engine ("ICE"). The ICE can be of any type, such as a piston-cylinder engine or a Wankel engine, for example. The ICE may be configured to run on any type of suitable fuel, such as diesel, gasoline, ethanol, or natural gas for example. The ICE may be located within a vehicle, such as an automobile, truck, machinery, aircraft, watercraft, or any other vehicle to provide power for locomotion, for example. However, it is also contemplated that the ICE could be used in other applications with or without a vehicle such as an electrical generator or to operate machinery, for example. FIG. 1 illustrates an example of a vehicle 10 with an ICE 12, a fuel tank 14, an air handling system 16, and an exhaust system 18.

Figure 2:
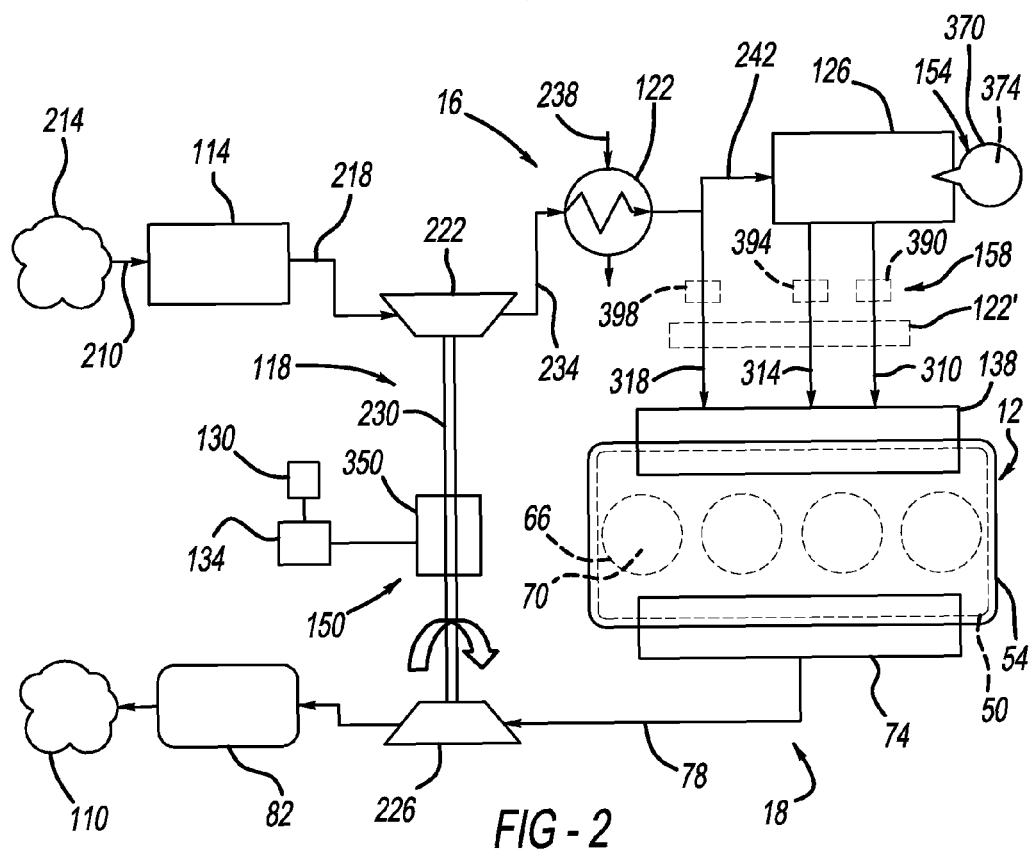
FIG. 2 is a schematic view of an ICE and an air handling system in accordance with the present teachings.

FIG. 2 illustrates a schematic view of the ICE 12, the air handling system 16, and the exhaust system 18. With additional reference to FIGS. 4-8, the ICE 12 in the particular example provided is illustrated as a piston-cylinder type including an engine block 50, a cylinder head 54, at least one compression device (e.g. piston) 58, and a fuel delivery device 62. The engine block 50 can define at least one cylinder 66. The number of cylinders 66 can correspond to the number of pistons 58. In the particular example, the ICE 12 is an inline four-cylinder engine, though any number of cylinders 66 in any configuration of the cylinders can be used. The piston 58 can be slidably received in the cylinder 66 and can be drivingly coupled to a crankshaft (not shown) to translate linear motion of the piston 58 within the cylinder 66 into rotational motion of the crankshaft. The cylinder 66, cylinder head 54, and piston 58 can define a combustion chamber 70. While illustrated and described herein with reference to a piston-cylinder type ICE 12, it is understood that the invention of the present disclosure can be used with other types of ICEs, such as rotary or Wankel engines for example. In such an engine, the compression device 58 can be a device other than a piston and the cylinder 66 can be replaced with appropriate corresponding geometry, such as the rotor and housing of a Wankel engine for example.

Returning again to FIG. 2, the exhaust system 18 can include an exhaust manifold 74, an exhaust line 78, and a post combustion emissions device 82. The exhaust manifold 74 can be coupled to the cylinder head 54 and configured to receive exhaust gasses expelled from the combustion chamber 70. The exhaust manifold 74 can be configured to direct the exhaust gasses into the exhaust line 78. The post combustion emissions device 82 can be disposed fluidly inline with the exhaust line 78 and can be any suitable emissions control device, such as a catalytic converter, selective catalytic reduction system, or a diesel particulate filter for example. The exhaust line 78 can be configured to expel the exhaust gasses received from the exhaust manifold 74 to an exterior environment 110 (e.g. the atmosphere) external to the ICE 12 or exterior to the vehicle 10 (FIG. 1).

The air handling system 16 can include an air filter 114, an air charging device 118, an air cooling device 122, and a gas separation device 126. The air handling system 16 can also include a sensor 130, a controller unit 134, an intake manifold 138, and a first, second, and/or third gas ratio control system 150, 154, 158. The air handling system 16 can also include a gas distribution system 162 (FIG. 5-8).

The first, second, and/or third gas ratio control systems 150, 154, 158 can each be configured to control a ratio of gasses (e.g. nitrogen-rich air, oxygen-rich air, intake air) that enter the combustion chamber 70 (FIG. 5) during an intake stroke of the ICE 12, as will be described below. The gas distribution system 162 (FIGS. 5-8) can be configured to distribute oxygen-rich air within a central area 170 (FIG. 5) of the combustion chamber 70 (FIG. 5) and distribute nitrogen-rich air within a peripheral area 174 (FIG. 5) of the combustion chamber 70 (FIG. 5), as will be described below.

The air handling system 16 can have a first conduit 210 in fluid communication with an intake air source 214, such as the atmosphere within an engine bay (not specifically shown) of the vehicle 10 (FIG. 1) or the atmosphere exterior of the vehicle 10 for example to receive intake air from the intake air source 214. The air filter 114 can be fluidly inline with the first conduit 210 and configured to receive the intake air therefrom. The air filter 114 can be any suitable type of filter configured to remove particles and contaminates from the air, such as dust, debris, or liquids for example from the intake air. The air filter 114 can be coupled for fluid communication with the air charging device 118 by a second conduit 218 configured to deliver the intake air from the air filter 114 to the air charging device 118.

The air charging device 118 can be any suitable charging device configured to receive intake air at a first pressure and output intake air at a second pressure that is higher than the first pressure. In the particular example provided, the air charging device 118 is a turbocharger system including a compressor 222, a turbine 226, and an input member 230. The turbine 226 can be fluidly inline with the exhaust line 78 and configured such that a turbine element (not specifically shown) of the turbine is rotationally driven by the flow of exhaust gasses through the turbine 226. The turbine 226 can be drivingly coupled to the input member 230 such that rotation of the turbine element can rotate the input member 230. The input member 230 can be drivingly coupled to a compressor element or impeller (not specifically shown) of the compressor 222 such that rotation of the input member 230 can rotate the impeller within the compressor 222. The compressor 222 can be fluidly coupled to the second conduit 218 to receive intake air therefrom. The compressor 222 can compress the intake air when the impeller rotates. While the particular example provided is described as a turbocharger system, other types of air charging devices can be used, such as superchargers, electric compressors, or hybrid air charging devices for example.

The air cooling device 122 can be any type of cooling device suitable for cooling pressurized or charged air, such as an intercooler, aftercooler, or other heat exchanger for example. The air cooling device 122 can be fluidly coupled to the compressor 222 by a third conduit 234 and configured to receive charged intake air therefrom. The air cooling device 122 can be configured such that a coolant 238 can flow through or across the air cooling device 122 to remove heat from the charged intake air flowing through the air cooling device 122. The coolant 238 can be air from the atmosphere about the ICE 12 or vehicle 10 (FIG. 1), or can be a liquid coolant such as water, oil, or a refrigerant for example. In the present example, the air cooling device 122 can be fluidly between the compressor 222 and the gas separation device 126 such that charged intake air is cooled prior to entering the gas separation device 126. In an alternative construction, shown in dashed lines, the air cooling device 122 can be located downstream of the gas separation device 126 to receive separated air from the gas separation device 126, as will be described below with reference to air cooling device 122'.

The gas separation device 126 can be fluidly coupled to the air cooling device 122 by a fourth conduit 242 to receive intake air therefrom. With additional reference to FIGS. 3A and 3B, the gas separation device 126 can be any type of device suitable for separating a stream of charged intake air 244 received from the compressor 222 into a stream of nitrogen-rich air 246 (i.e. $N_2$ rich air) and a stream of oxygen-rich air 250 (i.e. $O_2$ rich air). In the example provided, the gas separation device 126 can include a housing 254 and a membrane structure 258. The housing 254 can include an inlet 262, a first outlet 266, a second outlet 270, and can define an inner cavity 274. The inlet 262 can be in fluid communication with the fourth conduit 242 (FIG. 2) to receive intake air therefrom.

The membrane structure 258 can be disposed within the inner cavity 274 and can include a membrane wall 278 that is permeable to either oxygen or nitrogen. The membrane wall 278 separates the inner cavity into a first area 282 and a second area 286. The first area 282 can be in fluid communication with the first outlet 266. The second area 286 can be in fluid communication with the second outlet 270. In the example provided, the membrane structure 258 includes a plurality of cross-flow or tangential-flow membrane tubes 290 configured such that the permeate or filtrate passes through the membrane tubes 290 into the first area 282 and the retentate flows through the membrane tubes 290 through the second area 286, though other configurations can be used. In the example provided, the permeate of the membrane tubes 290 includes oxygen, carbon dioxide, and water, while the retentate includes nitrogen, though other configurations can be used. For example, the permeate can include nitrogen, while the retentate can include oxygen, carbon dioxide, and water. It is understood that the membrane structure 258 can be configured such that there can be other permeates or other retentates in addition to oxygen, carbon dioxide, water and nitrogen. The membrane structure 258 can be made of any suitable material or construction for separating nitrogen gas from oxygen gas, such as from sulfone polymers or fluoropolymers for example. In the particular example provided, the membrane structure 258 is coated with dioxole copolymerization tetrafluoroethylen, though other constructions can be used.

Returning to FIG. 2, the first outlet 266 (FIG. 3A) can be coupled for fluid communication to the intake manifold 138 by a fifth conduit 310. The second outlet 270 (FIG. 3A) can be coupled for fluid communication to the intake manifold 138 by a sixth conduit 314. The air cooling device 122, or the fourth conduit 242, can also be coupled for fluid communication to the intake manifold 138 by a seventh conduit 318. The intake manifold 138 can be coupled for fluid communication with the cylinder head 54. The cylinder head 54 can be configured to introduce the gasses from the fifth, sixth, and/or seventh conduits 310, 314, 318 into the combustion chamber 70 (FIG. 5) via the intake manifold 138 and the cylinder head 54. In a construction that includes the gas distribution system 162, the intake manifold 138 and cylinder head 54 can be configured to keep the nitrogen-rich air separate from the oxygen-rich air, as will be described below. In another construction that does not include the gas distribution system 162, the intake manifold 138 can permit mixing of the oxygen-rich air and the nitrogen-rich air within the intake manifold 138.

The first, second, and third gas ratio control systems 150, 154, 158 can be used together, in isolation, or in any combination of each. The first gas ratio control system 150 can be a turbo assist device configured to provide rotational power to operate the compressor 222. In the particular example provided, the first gas ratio control system 150 includes an electric motor 350. The electric motor 350 can be drivingly coupled to the input member 230 or to the impeller of the compressor 222 to rotate the impeller and compress intake air received by the compressor 222. The charging device 118 can be run in an electric mode, wherein the electric motor 350 provides all the rotational power for the impeller, a mechanical mode, wherein the turbine 226 provides all the rotational power for the impeller, or a hybrid mode, wherein the electric motor 350 can supplement the rotational power received from the turbine 226.

The electric motor 350 can be controlled by the controller unit 134 to selectively operate and control the rotational power output by the electric motor 350. The controller unit 134 can be configured to control the electric motor 350 to control the pressure of intake air exiting the compressor 222. Thus, the operation of the compressor 222 can be actively adjusted to provide a desired pressure for the gas separation device 126 regardless of the engine speed of the ICE 12 or the rotational speed of the turbine 226. In the example provided, the separation efficiency of the membrane structure 258 can correlate to the pressure of the gasses flowing through the gas separation device 126. Thus, the ratio of nitrogen-rich air to oxygen-rich air exiting the gas separation device 126 as well as the % of enrichment of the nitrogen-rich and oxygen-rich air exiting the gas separation device 126 can be controlled by varying the speed of the electric motor 350 which can control the pressure of the air flowing through the gas separation device 126.

Figure 3A:
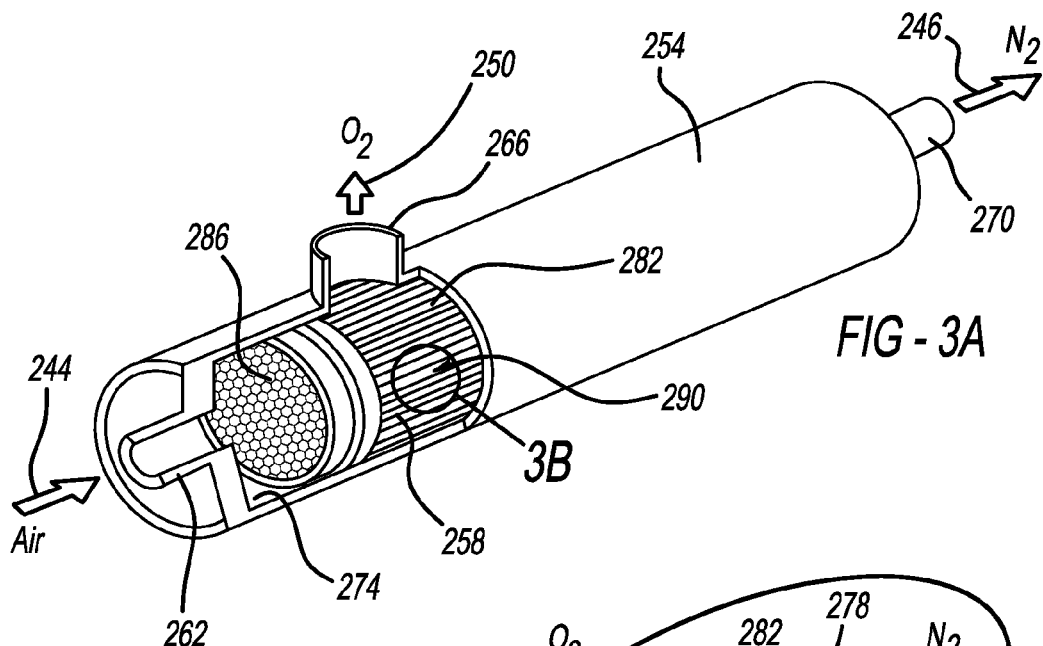
FIG. 3A is a partial sectional view of a gas separation device of the air handling system of FIG. 2.
Figure 3B:
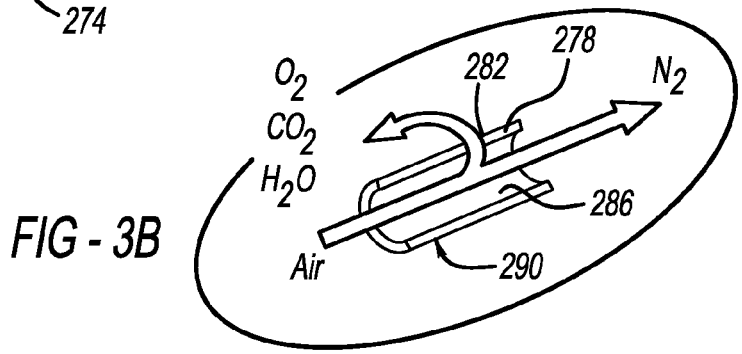
FIG. 3B is a sectional view of a portion of a membrane of the gas separation device of FIG. 3A.
Figure 4:
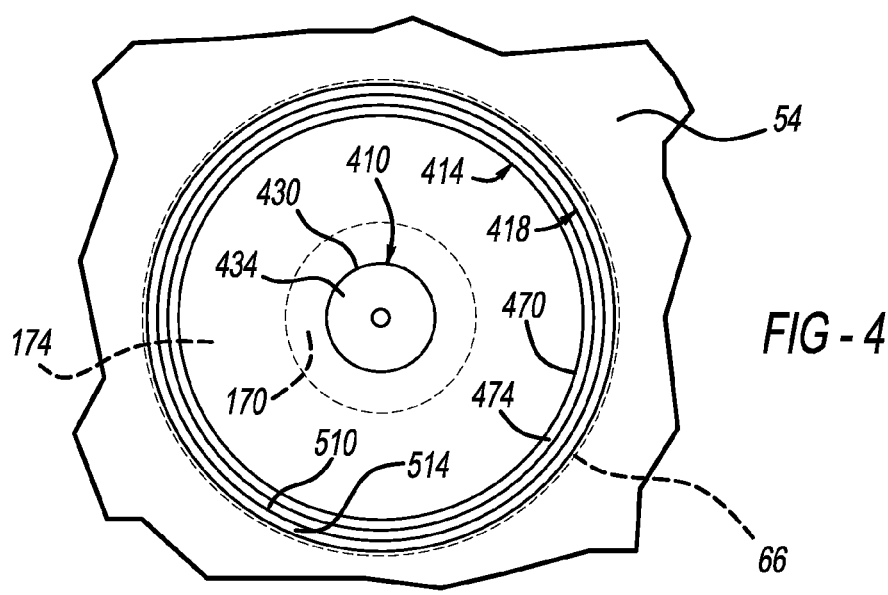
FIG. 4 is a plan view of a portion of a cylinder head of a first construction for use with the ICE of FIG. 2, illustrating a first intake valve and a second intake valve disposed annularly about the first intake valve.

The second gas ratio control system 154 can include a gas storage device 370. The gas storage device 370 can be configured to receive, retain, and selectively expel a volume of gas, such as some or all of the oxygen-rich stream of air 250 (FIG. 3A). The gas storage device 370 can be coupled for fluid communication with the first area 282 (FIG. 3B), the first outlet 266 (FIG. 3A), and the fifth conduit 310. The gas storage device 370 can define a chamber 374 that can have a variable volume. In the particular example provided, the chamber 374 is defined by a resilient material that can stretch or retract to expand or reduce the volume of the chamber 374, such as a balloon or an air bladder for example. It is understood that other variable volume gas storage devices may be used, such as those utilizing a diaphragm or piston-cylinder for example.

The gas storage device 370 can be controlled by the controller unit 134 to selectively permit the chamber 374 to take in oxygen-rich air in an intake mode, to retain the oxygen-rich air in a storage mode, and to release the oxygen-rich air into the fifth conduit 310 in a release mode. In the intake mode, the volume of the chamber 374 can increase to receive or draw in oxygen-rich air. In the storage mode, the volume of the chamber 374 can remain generally constant to retain the oxygen-rich air. In the release mode, the volume of the chamber 374 can reduce to expel the oxygen-rich air. The controller unit 134 can switch the gas storage device 370 between the intake, storage, and release modes based on operating conditions of the vehicle 10, the ICE 12, or external conditions sensed by the sensor 130. The sensor 130 can be any suitable sensor such as a temperature sensor, global positioning sensor ("OPS"), accelerometer, pressure sensor, velocity sensor, engine speed sensor, or throttle position sensor for example.

Figure 5:
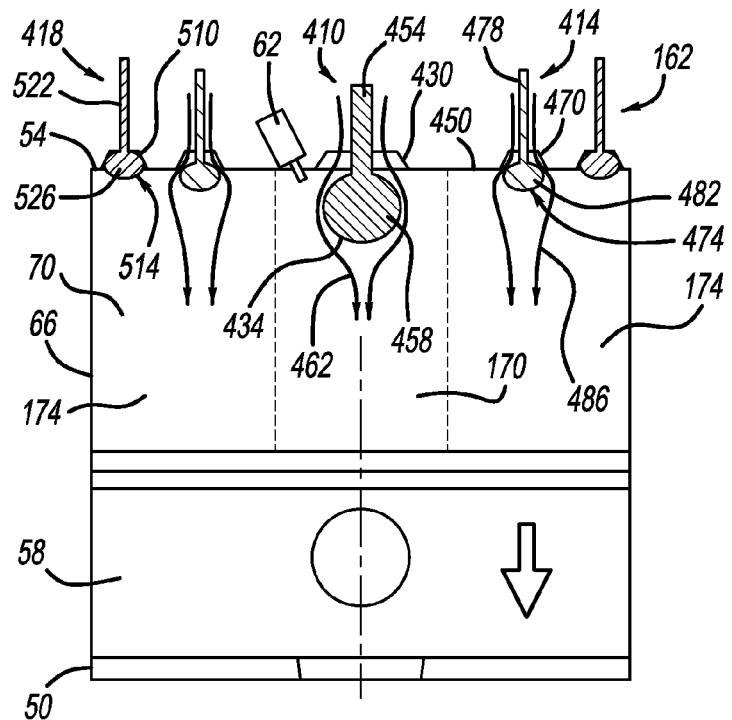
FIG. 5 is a sectional view of a portion of the ICE of FIG. 2, illustrating airflow through the cylinder head of FIG. 4 and into a combustion chamber of the ICE during an intake stroke.

For example, if the sensor 130 detects the vehicle 10 to be in a situation where increased power is not required or increased nitrogen-rich air is required, such as a hot start condition, a steady state condition, or a high ambient temperature condition for example, the controller unit 134 can switch the gas storage device to the intake mode to fill the chamber 374 with the oxygen-rich air that is not needed in the combustion chamber 70 (FIG. 5). When the amount of oxygen-rich air in the chamber 374 reaches a predetermined level, the controller unit 134 can switch the gas storage device 370 to the storage mode to hold the oxygen-rich air in the chamber 374 until it is needed for combustion. When the gas storage device 370 is at capacity or is in storage mode, excess oxygen-rich air that is produced and not needed can be vented to the atmosphere through a vent (not shown). Alternatively, the pressure difference between the first and second areas 282, 286 (FIGS. 3A and 3B) can inhibit additional production of oxygen-rich air. When the ICE 12 needs additional oxygen, such as during a cold start condition, driving up a hill, when increased acceleration is requested by the driver, or a decreased ambient temperature condition for example, the controller unit 134 can switch the gas storage device 370 to the release mode to release additional oxygen-rich air to be available for the combustion chamber 70 (FIG. 5).

Alternatively the gas storage device 370 can be configured to receive, retain, and selectively expel some or all of the nitrogen-rich stream of air 246 (FIG. 3A). In such a configuration, the gas storage device 370 can be coupled for fluid communication with the second area 286 (FIG. 3B), the second outlet 270 (FIG. 3A), and the sixth conduit 314. The controller unit 134 can be configured such that if the sensor 130 detects the vehicle 10 to be in a situation where increased power is required or increased oxygen-rich air is required, such as a cold start condition, driving up a hill, when increased acceleration is requested, or a decreased ambient temperature condition for example, the controller unit 134 can switch the gas storage device 370 to the intake mode to fill the chamber 374 with the nitrogen-rich air that is not needed in the combustion chamber 70 (FIG. 5). When the amount of nitrogen-rich air in the chamber 374 reaches a predetermined level, the controller unit 134 can switch the gas storage device 370 to the storage mode to hold the nitrogen-rich air in the chamber 374 until it is needed for combustion. When the gas storage device 370 is at capacity or in storage mode, excess nitrogen-rich air that is produced and not needed can be vented to the atmosphere through the vent (not shown). Alternatively, the pressure difference between the first and second areas 282, 286 (FIGS. 3A and 3B) can inhibit additional production of oxygen-rich air. When the ICE 12 needs additional nitrogen, such as during a hot start condition, a steady state condition, or a high ambient temperature condition for example, the controller unit 134 can switch the gas storage device 370 to the release mode to release additional nitrogen-rich air to be available to the combustion chamber 70 (FIG. 5).

In an alternative construction, the gas storage device 370 can be configured to receive nitrogen-rich air and oxygen-rich air in varying amounts and store the mixture until such a mixture is needed in the combustion chamber 70. The amounts or ratio of nitrogen-rich air to oxygen-rich air stored in the gas storage device 370 can be controlled by the controller unit 134 and can be based on the operating conditions of the vehicle 10, the ICE 12, external conditions or anticipated needs future conditions. In another an alternative construction, a second gas storage device (not specifically shown) can be used. The second gas storage device can be similar to the first gas storage device in structure and operation as described above. In such a construction, the first gas storage device 370 can be used to selectively store and release oxygen-rich air, while the second gas storage can selectively store and release nitrogen-rich air. The first and second gas storage devices can also be configured to hold mixtures of oxygen and nitrogen-rich air at different ratios.

The third gas ratio control system 158 is shown in dashed lines in FIG. 2 and can include a first valve 390, a second valve 394, and a third valve 398. The first valve 390 can be coupled fluidly inline with the fifth conduit 310 between the first outlet 266 and the intake manifold 138. The second valve 394 can be coupled fluidly inline with the sixth conduit 314 between the second outlet 270 and the intake manifold 138. The third valve 398 can be coupled fluidly inline with the seventh conduit 318 between the air cooling device 122 and the intake manifold 138. The first, second, and third valves 390, 394, 398 can be controlled by the controller unit 134 to selectively adjust the amount of flow through each of the fifth, sixth, and seventh conduits 310, 314, 318 to adjust the ratio of oxygen-rich air to nitrogen-rich air, to intake air available to the combustion chamber 70 (FIG. 5). In the construction without the gas distribution system 162, the respective amounts of gasses from the fifth, sixth, and seventh conduits 310, 314, 318 can mix in the intake manifold 138 before entering the combustion chamber 70 (FIG. 5). In an alternative construction, shown in dashed lines, the air cooling device 122' can replace or be used in addition to the air cooling device 122 and can be coupled fluidly inline with the fifth, sixth, and seventh conduits 310, 314, 318 between the first, second, and third valves 390, 394, 398 and the intake manifold 138. In such a construction, the air cooling device 122' can be configured to permit the mixing of the respective gasses from the fifth, sixth, and seventh conduits 310, 314, 318 within the air cooling device 122' before entering the intake manifold 138.

With additional reference to FIGS. 4-8, the gas distribution system 162 can include the cylinder head 54, a central or first intake valve 410, an annular or second intake valve 414, and an exhaust valve 418. The first intake valve 410 can have a first valve body 430, and a first valve element 434. The first valve body 430 can be formed in the cylinder head 54 or can be fixedly coupled thereto. The first valve body 430 can be coupled for fluid communication with the intake manifold 138 (FIG. 2) and configured to permit fluid communication between the intake manifold 138 and the combustion chamber 70. The intake manifold 138 (FIG. 2) can be configured such that the oxygen-rich air from the fifth conduit 310 (FIG. 2) is directed into the first valve body 430 without mixing with the nitrogen-rich air of the sixth conduit 314 (FIG. 2). The intake manifold 138 (FIG. 2) can be configured such that intake air from the seventh conduit 318 (FIG. 2) can be selectively mixed with the oxygen-rich air before introduction through the first valve body 430. Alternatively, an additional valve (not shown) can be used to introduce the intake air directly into the combustion chamber 70. The first valve body 430 can be disposed in the cylinder head 54 generally atop or adjacent to the central area 170 of the combustion chamber 70, generally coaxial with the cylinder 66 and piston 58. The first valve body 430 can be a generally round aperture in a top wall 450 of the cylinder head 54 that forms the top of the combustion chamber 70.

Figure 6:
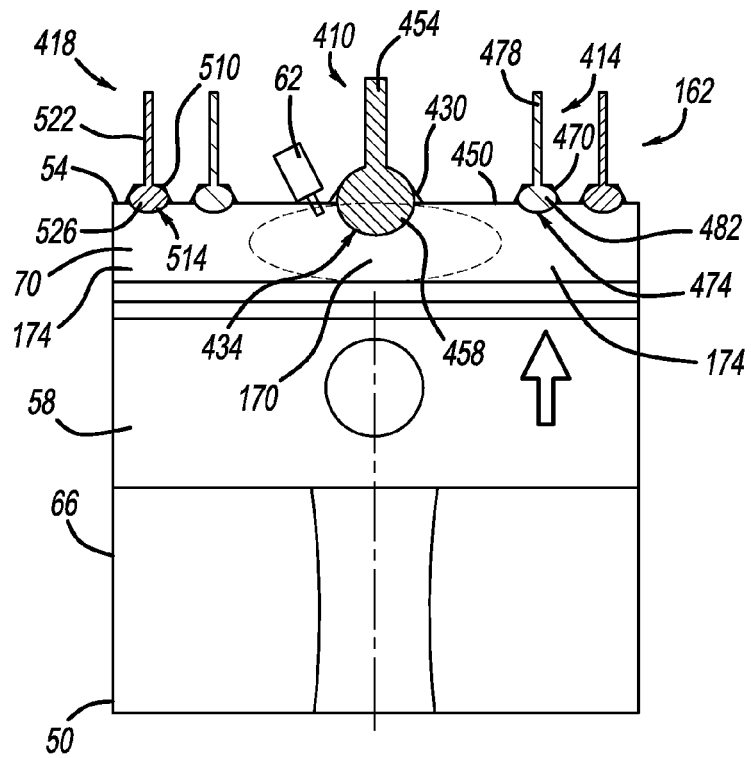
FIG. 6 is a sectional view similar to FIG. 5, illustrating a distribution of oxygen-rich air and nitrogen-rich air within the combustion chamber during a compression stroke.

The first valve element 434 can include a first stem 454 and a first head 458 fixedly coupled to an end of the first stem 454. The first valve element 434 can be moveable relative to the first valve body 430 between an open position (FIG. 5) and a closed position (FIGS. 6-8). In the open position, the first head 458 can be spaced apart from the first valve body 430 such that an oxygen-rich flow 462 can flow through the first valve body 430 and into the combustion chamber 70. In the closed position, the first head 458 can be seated on the first valve body 430 to seal and inhibit fluid flow through the first valve body 430. The first valve element 434 can be moved between the open and closed positions by any suitable means, such as solenoids, cams, or lifters for example. Movement of the first valve element 434 between the open and closed positions can also be controlled by the controller unit 134. In the particular example provided, the first head 458 is a rounded, or generally spherical shape configured to direct the oxygen-rich flow 462 toward the central area 170 and limit turbulent mixing of the oxygen-rich flow 462 outside of the central area 170. While illustrated as a rounded shape, the first head 458 can be other shapes configured to prevent or limit mixing of the oxygen-rich flow 462 outside of the central area 170 and with a nitrogen-rich flow 486, which will be described below. For example, the first head 458 have a tapered cross-sectional shape similar to poppet valves. While not specifically shown, the gas distribution system 162 can include a plurality of first intake valves 410 that can be arranged within or about the central area 170 to direct oxygen-rich air into the central area 170.

The second intake valve 414 can have a second valve body 470, and a second valve element 474. The second valve body 470 can be formed in the cylinder head 54 or can be fixedly coupled thereto. The second valve body 470 can be coupled for fluid communication with the intake manifold 138 (FIG. 2) and configured to permit fluid communication between the intake manifold 138 and the combustion chamber 70. The intake manifold 138 (FIG. 2) can be configured such that the nitrogen-rich air from the sixth conduit 314 (FIG. 2) is directed into the second valve body 470 without mixing with the oxygen-rich air of the fifth conduit 310 (FIG. 2). The intake manifold 138 (FIG. 2) can be configured such that intake air from the seventh conduit 318 (FIG. 2) can be selectively mixed with the nitrogen-rich air before introduction through the second valve body 470. Alternatively, the additional valve (not shown) can be used to introduce the intake air directly into the combustion chamber 70. The second valve body 470 can be disposed in the cylinder head 54 generally atop or adjacent to the peripheral area 174 of the combustion chamber 70, generally coaxial with the cylinder 66 and piston 58 and radially outward of the first valve body 430. The second valve body 470 can be a generally annular, or ring-shaped aperture in the top wall 450 of the cylinder head 54 disposed radially about the first valve body 430.

The second valve element 474 can include a second stem 478 and a second head 482 fixedly coupled to an end of the second stem 478. The second valve element 474 can be moveable relative to the second valve body 470 between an open position (FIG. 5) and a closed position (FIGS. 6-8). In the open position, the second head 482 can be spaced apart from the second valve body 470 such that the nitrogen-rich flow 486 can flow through the second valve body 470 and into the combustion chamber 70. In the closed position, the second head 482 can be seated on the second valve body 470 to seal and inhibit fluid flow through the second valve body 470. The second valve element 474 can be moved between the open and closed positions by any suitable means, such as solenoids, cams, or lifters for example. Movement of the second valve element 474 between the open and closed positions can also be controlled by the controller unit 134. In the particular example provided, the second head 482 is a rounded, or generally oval shape configured to direct the nitrogen-rich flow 486 toward the peripheral area 174 and limit turbulent mixing of the nitrogen-rich flow 486 outside of the peripheral area 174. Thus, the oxygen-rich flow 462 and nitrogen-rich flow 486 remain substantially separate while in the combustion chamber 70. While illustrated as a rounded shape, the second head 482 can be other shapes configured to prevent or limit mixing of the nitrogen-rich flow 486 outside of the peripheral area 174 and with the oxygen-rich flow 462. For example, the second head 482 have a tapered cross-sectional shape similar to poppet valves. While not specifically shown, the gas distribution system 162 can include a plurality of second intake valves 414 that can be arranged within or about the peripheral area 174 to direct nitrogen-rich air into the peripheral area 174.

The exhaust valve 418 can have an exhaust valve body 510, and an exhaust valve element 514. The exhaust valve body 510 can be formed in the cylinder head 54 or can be fixedly coupled thereto. The exhaust valve body 510 can be coupled for fluid communication with the exhaust manifold 74 (FIG. 2) to permit an exhaust gas flow 518 (FIG. 8) to exit the combustion chamber 70 and enter the exhaust line (FIG. 2) via the exhaust manifold 74. The exhaust valve body 510 can be disposed in the cylinder head 54 generally atop or adjacent to the peripheral area 174 of the combustion chamber 70, generally coaxial with the cylinder 66 and piston 58 and radially outward of the first valve body 430. The exhaust valve body 510 can be a generally annular, or ring-shaped aperture in the top wall 450 of the cylinder head 54 disposed radially about the first valve body 430. In the example provided, the exhaust valve body 510 is also disposed radially about the second valve body 470, though the exhaust valve body 510 can be disposed radially inward of the second valve body 470.

The exhaust valve element 514 can include an exhaust stem 522 and an exhaust head 526 fixedly coupled to an end of the exhaust stem 522. The exhaust valve element 514 can be moveable relative to the exhaust valve body 510 between an open position (FIG. 8) and a closed position (FIGS. 5-7). In the open position, the exhaust head 526 can be spaced apart from the exhaust valve body 510 such that the exhaust gas flow 518 can flow through the exhaust valve body 510 and out of the combustion chamber 70 to the exhaust manifold 74 (FIG. 2). In the closed position, the exhaust head 526 can be seated on the exhaust valve body 510 to seal and inhibit fluid flow through the exhaust valve body 510. The exhaust valve element 514 can be moved between the open and closed positions by any suitable means, such as solenoids, cams, or lifters for example. Movement of the exhaust valve element 514 between the open and closed positions can also be controlled by the controller unit 134. While illustrated as a rounded shape, the exhaust head 526 can be other shapes configured to aid the exit of the exhaust gas flow 518 from the combustion chamber 70. For example, the exhaust head 526 have a tapered cross-sectional shape similar to poppet valves. While not specifically shown, the gas distribution system 162 can include a plurality of exhaust valves 418 that can be arranged within or about the peripheral area 174 or the central area 170 to permit the exhaust of combustion gasses from the combustion chamber 70.

In operation, the first and second intake valves 410, 414 can be open during an intake stroke of the piston 58, as shown in FIG. 5. During the intake stroke, the exhaust valve 418 can be closed and the piston 58 can move axially away from the cylinder head 54 to increase the volume of the combustion chamber 70 and draw the air through the first and second intake valves 410, 414. The first intake valve 410, second intake valve 414, and exhaust valve 418 can then close during a compression stroke of the piston 58, as shown in FIG. 6. During the compression stroke, the piston 58 moves axially toward the cylinder head 54 to reduce the volume of the combustion chamber 70 and compress the gasses and an amount of fuel (not specifically shown) within the combustion chamber 70. The fuel can be injected into the combustion chamber 70 by the fuel delivery device 62 and can be injected directly into the central area 170, such as by a fuel injector for example, to mix with the oxygen-rich air. The fuel delivery device 62 can introduce the fuel into the combustion chamber 70 during the intake stroke, or during the compression stroke. Alternatively, the fuel can be introduced into the oxygen-rich flow 462 before entering the combustion chamber 70. An ignition device (not specifically shown), such as a spark plug for example, can ignite the air-fuel mixture to cause combustion. Alternatively, such as when the ICE 12 is a compression ignition engine, a device can optionally be included to add heat to the air-fuel mixture to assist in its ignition when the heat of compression would otherwise be insufficient, such as a glow plug used during cold start conditions for example. Combustion of the air-fuel mixture generally causes expansion of hot combustion gasses in the central area 170 of the combustion chamber 70 resulting in a power stroke of the piston 58 (FIG. 7). During the power stroke, the piston 58 can move axially away from the cylinder head 54 to rotate the crankshaft (not shown). The nitrogen-rich air disposed about the peripheral area 174 can be relatively cooler and can act to absorb some of the heat produced by combustion to reduce the amount of heat absorbed by the cylinder 66 of the ICE 12 while also reducing NOx emissions. In this way the gas distribution system 162 can increase the thermal efficiency of the ICE 12 and decrease emissions. During an exhaust stroke of the piston 58 (FIG. 8), the exhaust valve 418 can be opened and the piston 58 can move axially toward the cylinder head 54 to reduce the volume of the combustion chamber 70 and expel the combustion gasses through the exhaust valve 418.

Figure 9:
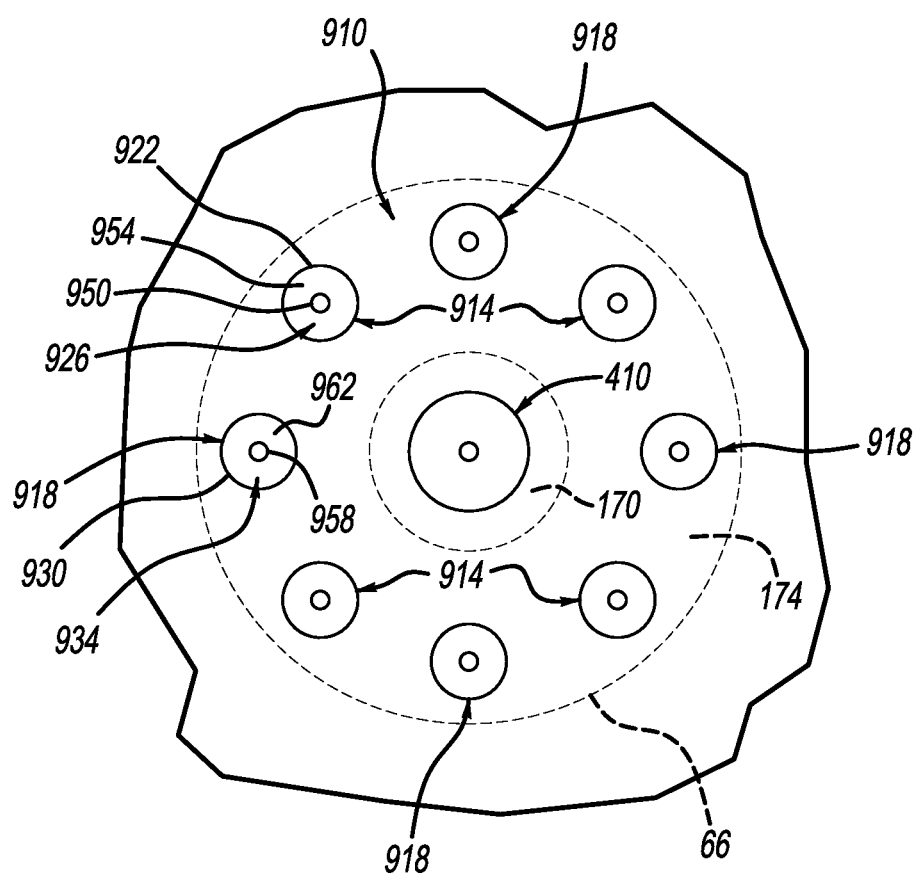
FIG. 9 is a plan view of a portion of a cylinder head of a second construction for use with the ICE of FIG. 2, illustrating a first intake valve and a radial array of second intake valves.

With additional reference to FIG. 9, an alternative construction of a gas distribution system is illustrated with reference numeral 910. The descriptions of similarly numbered elements described above are incorporated herein and will not be repeated. The gas distribution system 910 can include the first intake valve 410, a plurality of second intake valves 914, and a plurality of exhaust valves 918. The second intake valves 914 and the exhaust valves 918 can be disposed in the cylinder head 54 and spaced circumferentially about the first intake valve 410 in a radial array about the peripheral area 174 of the combustion chamber 70. In the example provided, the second intake valve 414 and the exhaust valves 918 can be equally spaced apart and can alternate circumferentially, though other configurations can be used.

The second intake valves 914 and the exhaust valves 918 can be similar to the first intake valve 410 in construction and can respectively include a second valve body 922, a second valve element 926, an exhaust valve body 930, and an exhaust valve element 934. The second valve body 922 and the exhaust valve body 930 can be formed in the cylinder head 54 or can be fixedly coupled thereto. The second valve body 922 can be coupled for fluid communication with the intake manifold 138 (FIG. 2) and configured to permit fluid communication between the intake manifold 138 and the combustion chamber 70. The intake manifold 138 (FIG. 2) can be configured such that the nitrogen-rich air from the sixth conduit 314 (FIG. 2) is directed into the second valve body 922 without mixing with the oxygen-rich air of the fifth conduit 310 (FIG. 2). The intake manifold 138 (FIG. 2) can be configured such that intake air from the seventh conduit 318 (FIG. 2) can be selectively mixed with the nitrogen-rich air before introduction through the second valve body 922. Alternatively, the additional valve (not shown) can be used to introduce the intake air directly into the combustion chamber 70. The second valve body 922 and the exhaust valve body 930 can be disposed in the cylinder head 54 generally atop or adjacent to the peripheral area 174 of the combustion chamber 70. The second valve body 922 and the exhaust valve body 930 can be generally round apertures in the top wall 450 of the cylinder head 54.

The second valve element 926 and the exhaust valve element 934 can respectively include a second stem 950, a second head 954, an exhaust stem 958, and an exhaust head 962. The second head 954 and the exhaust head 962 can be fixedly coupled to an end of the respective second stem 950 and exhaust stem 958. The second valve element 926 and the exhaust valve element 934 can be moveable relative to their respective second valve body 922 and exhaust valve body 930 between open and a closed positions. In the open position of the second valve element 926, the second head 954 can be spaced apart from the second valve body 922 such that a nitrogen-rich flow (not specifically shown) can flow through the second valve body 922 and into the peripheral area 174 of the combustion chamber 70. The array of second intake valves 914 about the peripheral area 174 can permit the nitrogen-rich air to surround the oxygen-rich air within the combustion chamber 70 similar to that described above with reference to FIGS. 5-8. In the open position of the exhaust valve element 934, the exhaust head 962 can be spaced apart from the exhaust valve body 930 such that combustion gasses (not specifically shown) can flow through the exhaust valve body 930 from the combustion chamber 70 and into the exhaust manifold 74. In their closed positions, the second head 954 and the exhaust head 962 can be seated on their respective second valve body 922 and exhaust valve body 930 to seal and inhibit fluid flow through the second valve body 922 and the exhaust valve body 930. The second valve element 926 and the exhaust valve element 934 can be moved between their open and closed positions by any suitable means, such as solenoids, cams, or lifters for example. Movement of the second valve element 926 and the exhaust valve element 934 between the open and closed positions can also be controlled by the controller unit 134. In the particular example provided, the second head 954 is a shape, such as rounded or generally spherical for example, that is configured to direct the nitrogen-rich flow toward the peripheral area 174 and limit turbulent mixing of the nitrogen-rich flow outside of the peripheral area 174. In operation, the gas distribution system 910 can operate similarly to the gas distribution system 162 through the intake, compression, power, and exhaust strokes of the piston 58. Either of the gas distribution systems 162, 910 can be used with either of the gas ratio control systems 150, 154, 158 described above, or a combination thereof.

In an alternative construction of a gas distribution system, not specifically shown, an injector (not shown) can replace the first intake valve 410 of either of the gas distribution systems 162, 910. The injector can be mounted in the cylinder head 54 and can be coupled for fluid communication to the intake manifold 138 (FIG. 2) to receive oxygen-rich air from the sixth conduit 314 (FIG. 2) or the gas storage device 370 (FIG. 2). The injector can be configured to inject the oxygen-rich air into the central area 170 of the combustion chamber 70. The injector can be any suitable injector configured to selectively inject a volume of oxygen-rich air in a gaseous state. For example, the injector can be similar to gas injectors commonly used to inject compressed natural gas into the combustion chambers of ICEs fueled by compressed natural gas. However, in this alternative construction, the injector is used to inject the oxygen (e.g. the oxygen-rich air) and not the fuel (e.g. diesel, gasoline, ethanol, or natural gas). Other than the injector replacing the first intake valve 410, the gas distribution system of this construction can be constructed and can operate similarly to the gas distribution systems 162, 910.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An air system for an internal combustion engine having a combustion chamber, the air system comprising:
   a separator configured to receive a first volume of intake air and separate the first volume of intake aft into a volume of nitrogen-rich air and a volume of oxygen-rich air; and
   at least one of a first valve; a second valve, and a gas injector in fluid communication with the separator and the combustion chamber, and configured to direct the volume of oxygen-rich air into a central area of the combustion chamber and the volume of nitrogen-rich air about a periphery of the combustion chamber.

2. The air system of claim 1, wherein:
   the first valve is configured to direct oxygen-rich air to the central area of the combustion chamber; and
   the second valve is configured to direct nitrogen-rich air to the peripheral area of the combustion chamber, the second valve having a valve body and a valve element that is movable relative to the valve body, the valve body and valve element having annular shapes disposed about the first valve.

3. The air system of claim 1, wherein:
   the first valve is configured to direct oxygen-rich air to the central area of the combustion chamber; and
   the second valve is one of a plurality of second valves configured to direct nitrogen-rich air to the peripheral area of the combustion chamber, the second valves being disposed in a radial array about the first valve.

4. The air system of claim 1, wherein:
   the gas injector is configured to inject oxygen-rich air into the central area of the combustion chamber; and
   at least one of the gas injector or at least one second valve being configured to direct nitrogen-rich air to the peripheral area of the combustion chamber.

5. The air system of claim 1, further comprising:
   a compressor configured to compress intake air, the compressor having an input; and
   an electric motor drivingly coupled to the input and configured to control a speed at which the input rotates to adjust a pressure output of the compressor;
   wherein the separator includes a housing and a membrane, the housing being fluidly coupled to the compressor and configured to receive a first volume of intake air from the compressor, the membrane being disposed within the housing and configured to separate the first volume of intake air into a volume of nitrogen-rich air and a volume of oxygen-rich air.

6. An of system for an internal combustion engine having a combustion chamber, the air system comprising:
a compressor configured to compress intake air;
a separator including a housing and a membrane, the housing being fluidly coupled to the compressor and configured to receive a first volume of intake air from the compressor, the membrane being disposed within the housing and configured to separate the first volume of intake aft into a volume of nitrogen-rich aft and a volume of oxygen-rich aft; a first conduit fluidly coupling the compressor to the combustion chamber; a second conduit fluidly coupling the compressor to the separator;
a first valve in fluid communication with the first conduit and configured to selectively inhibit flow of intake air from the compressor to the combustion chamber through the first conduit;
a second valve in fluid communication with the separator and configured to selectively inhibit flow of one of the volume of oxygen-rich of or the volume of nitrogen-rich at from the separator to the combustion chamber;
a third valve in fluid communication with the separator and configured to selectively inhibit flow of at least one of an additional volume of oxygen-rich aft and an additional volume of nitrogen-rich air from the separator to the combustion chamber; and
a controller unit configured to adjust the first, second, and third valves based on operating conditions of the internal combustion engine to control a ratio of gasses that enter the combustion chamber during an intake stroke of the internal combustion engine, the gasses including the volume of nitrogen-rich air, and the volume of oxygen-rich air.

7. The air system of claim 1, wherein the controller unit is configured to adjust the first, second, and third valves to provide an increased ratio of oxygen-rich air during one of a cold start condition, an acceleration condition, or a high load condition detected by the controller unit, wherein the controller unit is configured to adjust the first, second, and third valves to provide an increased ratio of nitrogen-rich air during one of a hot start condition, a steady state condition, or a high ambient temperature condition detected by the controller unit.

8. The air system of claim 1, further comprising a heat exchanger disposed between the compressor and the combustion chamber.

9. The air system of claim 8, wherein the heat exchanger is disposed between the combustion chamber and the first, second and third valves, the heat exchanger being configured to mix the volume of oxygen-rich air, the volume of nitrogen-rich air, and the second volume of intake air.

10. The air system of claim 1, further comprising an electric motor drivingly coupled to an input of the compressor, the motor being configured to control a speed at which the input rotates to adjust a pressure of the first volume of intake air.

11. The air system of claim 10, further comprising a turbine in fluid communication with the combustion chamber, the turbine being drivingly coupled to the input of the compressor.

12. The air system of claim 1, further comprising a first storage tank device coupled for fluid communication with the separator and the combustion chamber, the first storage tank being configured to store a first volume of reserve air, the first volume of reserve air being one of the volume of oxygen-rich air, the volume of nitrogen-rich air, or a first mixture of the volume of oxygen-rich air and nitrogen-rich air received from the separator, the first storage tank being configured to selectively release the first volume of reserve air to the combustion chamber.

13. The air system of claim 12, wherein the first storage tank includes a chamber having a variable volume.

14. The air system of claim 12, further comprising a second storage tank coupled for fluid communication with the separator and the combustion chamber, the second storage tank being configured to store a second volume of reserve air, the second volume of reserve air being one of the volume of oxygen-rich air, the volume of nitrogen-rich air, or a second mixture of the volume of oxygen-rich air and nitrogen-rich air.

15. The air system of claim 14, wherein the second storage tank device includes a chamber having a variable volume.

16. A method of operating an internal combustion engine having a combustion chamber, a sensor, an air charger, an air separation membrane, a first valve configured to selectively inhibit flow of intake air from a compressor to the combustion chamber through a first conduit, a second valve configured to selectively inhibit flow of one of a volume of oxygen-rich air or the volume of nitrogen-rich air from the air separation membrane to the combustion chamber, and a third valve configured to selectively inhibit flow of at least one of an additional volume separation membrane to the combustion chamber, the method comprising:
sensing an operating condition of the internal combustion engine with the sensor;
separating, with the air separation membrane, a volume of output air into a nitrogen-rich stream of aft and an oxygen-rich stream of air; introducing the oxygen-rich stream of air into the combustion chamber at a central area of the combustion chamber during an intake stroke of the internal combustion engine;
introducing the nitrogen-rich stream of air into the combustion chamber at a peripheral area of the combustion chamber during the intake stroke of the internal combustion engine; and
adjusting the first, second, and third valves via a controller unit to
increase a ratio of the oxygen-rich stream of aft to the nitrogen-rich stream of aft if the operating condition of the internal combustion engine is one of a cold start condition, an acceleration condition, a high load condition, or a low ambient temperature condition; and
decrease the ratio of the oxygen-rich stream of air to the nitrogen-rich stream of air if the operating condition of the internal combustion engine is one of a hot start condition, a steady state condition, or a high ambient temperature condition.

17. The method of claim 16, further comprising:
cooling the volume of output air before separating the volume of output air into the nitrogen-rich and oxygen-rich streams of air.

* * * * *